F. C. HOWE.
FAN.
APPLICATION FILED NOV. 13, 1916.
1,247,838. Patented Nov. 27, 1917.
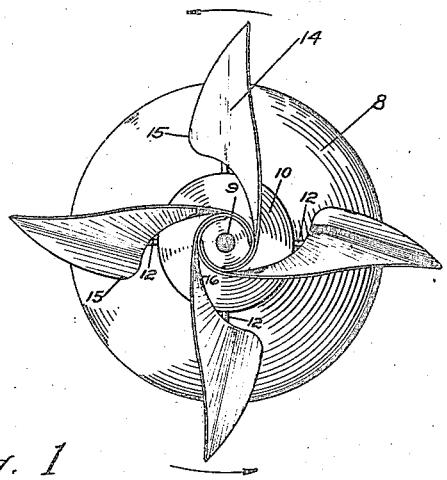
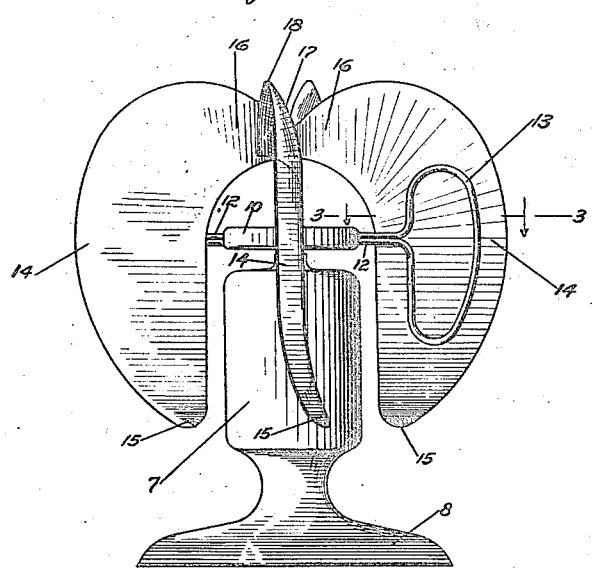
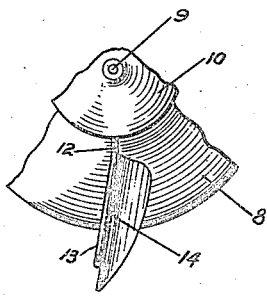

UNITED STATES PATENT OFFICE.

FRED C. HOWE, OF NEW HAVEN, CONNECTICUT.

FAN.

1,247,838. Specification of Letters Patent. Patented Nov. 27, 1917.

Application filed November 13, 1916. Serial No. 130,942.

*To all whom it may concern:*

Be it known that I, FRED C. HOWE, a citizen of the United States, residing at New Haven, county of New Haven, State of Connecticut, have invented an Improvement in Fans, of which the following is a specification.

This invention relates to so-called electric fans, with more particular reference to the self-contained devices now in such general commercial and domestic use to generate air currents for the cooling or refreshment of an individual or a group of individuals in a room, and thus afford temporary relief from high temperature conditions. These devices, as a rule, are designed to generate a more or less powerful current of air the direction of which is controlled by the disposition of the fan blades and is either constant—as where the blades rotate or revolve about a fixed axis of rotation or revolution—or which varies with bodily movement of the fan blades and their actuating mechanism, due to the provision of means for rotating or rocking these elements, to and fro, through a predetermined arc. Under any circumstances, however, when the generated air currents are directed along parallel or slightly diverging lines, in what may be said to be one general direction, whether such direction is constant or variable, the most that can be accomplished in addition to the creation of a strong draft is a general agitation of the air in the immediate vicinity of the fan in largely irregular and unpredeterminable currents, providing a certain amount of air diffusion with either inadequate results—as when the breeze is only periodically directly effective and inconveniently over-powerful when effective—or with objectionably superfluous results—as when a current of air of relatively high intensity is constantly delivered in one direction.

The principal object of the present invention is the provision of a fan which will not only so modify the velocity of the air current as to insure the desired, without superfluous or objectionably sudden, results in its effects upon a human body against which it is directed, but which will generate air currents the direction of which is predetermined to conform to the hygienic principles of ventilation and air diffusion.

My invention will be more readily understood by reference to the accompanying drawings, forming a part of this specification, in which—

Figure 1 is a side elevation of a practical and convenient embodiment of my invention;

Fig. 2 is a top plan view thereof, and

Fig. 3 is a fragmentary sectional view taken substantially on the line 3—3 of Fig. 1.

Referring now to the drawings in detail, numeral 7 designates an electric motor, which may be of any preferred standard construction and which, as its interior mechanism forms no part of the present invention, need not be described in detail here. This motor is designed to be connected in any common and well-known manner with a suitable source of electric energy, and is preferably provided with a base 8 in order that the device may be stably supported upon a table, desk or the like. The motor shaft 9 projects through the upper face of the motor casing and has mounted thereon, immediately above the motor and at the upper end of said shaft, the disk or disk-wheel 10.

Mounted in the peripheral edge of the disk-wheel 10 and projecting therefrom in substantially radial directions are a plurality of equidistantly disposed arms 12 12. These arms brace and contribute to the support of the fan blades in a manner which will hereinafter be described, and for the purposes of this description I have shown four of these arms, spaced apart by angles of 90° each, although it will be apparent that three arms or more than four arms may be employed if desired. The character and construction of these arms is not an essential element of this invention, but I prefer that each should be formed from a single strand of comparatively stiff wire curved to provide an elongated vertical loop 13 with the ends of the wire brought together at a point intermediate the ends of the major axis of the loop, from which point the two end portions are passed into a suitable retaining socket in the disk 10, where they are soldered or otherwise suitably secured.

Each of the fan blades is formed from a single blank of sheet-metal and comprises what may be termed a major middle portion 14 which is flat, vertically disposed and of relatively the greatest width. From this major middle portion, the blade not only tapers downwardly to a relatively narrow and rounded extremity 15, but is also laterally curved in the direction in which the blades are designed to revolve with the motor shaft 9. The upper ends of the blades not only similarly taper to relatively narrow width, but are curved edgewise, as at 16 (Fig. 1) in the direction of each other, whereby these upper extremities may be curled into circularly overlapping relationship (Fig. 2) and secured to each other in any suitable manner, such as by screws or rivets (not shown). Furthermore, in addition to being curved edgewise in the direction of each other, these upper blade extremities are also slightly curved both horizontally and vertically in a direction opposite to the direction of the curvature of the lower end 15 of the blade, whereby an upper face 17 (Fig. 1) is provided which tapers rearwardly from the face of the flat major portion 14 of the blade and also tapers rearwardly on both sides of a transverse vertical plane through what may be termed the apex 18 of the blade.

The major middle portion 14 of each blade, in addition to being flat and vertically disposed, is slightly inclined rearwardly from the true radial line of the arm 12, as best shown in Fig. 3, and this inclination is continued throughout the entire lower portion of the blade. Therefore, each of the arms 12, to the loops 13 of which these blades are rigidly secured in any desired manner, as by soldering, is correspondingly bent.

It will now be apparent that upon rapid revolution of the fan blades, in the direction of the arrows shown in Fig. 2, the flat major middle portions of the blades will transmit maximum impulses to the air in front of said blades and generate centrifugal currents of relatively maximum intensity. At the same time, the curved upper portions of the blades will similarly generate currents which become gradually reduced in intensity—due both to the reduced area of compressing surface and to reduced velocity of the blade portions as they approach the center of revolution—as the direction of these currents approach the vertical. However, upwardly directed currents are generated, and these currents are not only radially substantially continuous and uniform in a horizontal plane but are also radially continuous in vertical planes above said horizontal plane, although gradually reduced in intensity as they approach the vertical.

Obviously, the air to be compressed and set in motion by the fan blades must come from below, and to facilitate the flow of air into the fan to relieve the partial vacuums formed behind each revolving blade, I provide the curved lower extremity 15 of the blades hereinbefore described. This inflowing air may be said to be largely drawn from a horizontal stratum below the blades, which stratum, of course, gradually increases in depth or thickness as the distance from the fan increases. Now, as this air is driven off in all directions above what may be termed the horizontal plane of the fan, the effect will be analogous to that of an ornamental fountain, and the distribution or diffusion of the air will be neither confined to certain limits of space nor permiscuous, for if the fan is placed on a table or the like near the center of a room, air currents of moderate yet effective intensity are directed radially in substantially horizontal planes continuously to all parts of the room, and are not only also directed upwardly with less intensity but in all directions between the horizontal and the vertical. The employment of a fan embodying my invention, therefore, not only directs a continuous air current at an individual or a group of individuals, or toward a certain spot for facilitating and hastening evaporation—which is the real cause of the cooling effect of a device of this character—but also sets up a continuous flow of air throughout an entire inclosure of ordinary dimensions or throughout the space for a substantial distance from the fan in all directions which conforms to the hygienic principles of ventilation and air diffusion.

For example, the present best-known type of electric fan, which is designed to concentrate to a greater or less extent the generated air currents, has little effect upon the strata of air at the top of the room or chamber in which the fan is used, and it is well known that these upper strata of air are not only of higher temperature than the lower strata, but if containing impurities are the most difficult to reach under ordinary and usual methods of ventilation. Therefore, a fan which is designed to concentrate the air currents to a greater or less extent is little more than an agitator of the air, and particularly if the fan itself rocks or oscillates, both the intensity and direction of the currents is largely without system and altogether without substantial purpose other than the effect of the concentrated air currents upon one or more persons located in the path of such current.

On the other hand, a portion of the currents generated by a fan embodying my invention are directed upwardly and will reach the ceiling of a room of ordinary dimensions with sufficient force to be deflected laterally in all directions thereby, thus setting up, in addition to horizontal currents of moderate intensity, upwardly directed currents which are deflected laterally by the ceiling and then descend along the side walls of the room, a portion of the air thereof doubtless again being drawn into the fan, whereby a systematic circulation of the air in a room is insured, and parts of the room properly ventilated not only in what may be termed a scientifically hygienic manner, but in a manner which would be impossible through the employment of a one-direction concentrating fan.

Furthermore, it will be noted that a fan embodying my invention is not only exceedingly compact, occupying but little space even if equipped with a protecting cage, but that it is symmetrical in outline and particularly ornamental, especially when the blades are in motion, when it has the appearance of a sphere mounted on a base. The very designing of the blades in my fan, to produce the best results, permits of the interposition of the motor between the blades, thus naturally enhancing the degree of compactness which I am enabled to attain in the fan of my invention.

Many modifications of my improved fan will doubtless readily suggest themselves to those skilled in the art to which it appertains, and I therefore do not desire to limit my invention to the specific construction herein shown and described.

I claim as new and desire to secure by Letters Patent:

1. A fan comprising a rotatable element and a plurality of blades mounted thereon to revolve therewith, said blades being disposed longitudinally and substantially edgewise with respect to the axis of revolution, the upper ends thereof being turned inwardly toward each other and the lower portions tapering to relatively narrow and forwardly curled extremities.

2. A fan comprising a rotatable element and a plurality of blades mounted thereon to revolve therewith, said blades being disposed longitudinally and substantially edgewise with respect to the axis of rotation and the upper portion thereof being turned edgewise in the direction of each other and curved both longitudinally and transversely in a rearward direction.

3. A fan comprising a rotatable element and a plurality of blades mounted thereon to revolve therewith, said blades being disposed longitudinally with respect to the axis of revolution and each thereof being slightly inclined rearwardly from the radius of the orbit of revolution, the upper ends of said blades being turned inwardly toward each other and the lower portions thereof tapering to relatively narrow and forwardly curled extremities.

4. A fan comprising a rotatable element and a plurality of blades carried thereby to revolve therewith, said blades being disposed longitudinally and substantially edgewise with respect to the axis of revolution, the upper ends thereof being of reduced width and being curved inwardly and meeting above the upper end of said element where they are suitably secured together.

5. A fan comprising a rotatable element and a plurality of blades carried thereby to revolve therewith, said blades being disposed longitudinally and substantially edgewise with respect to the axis of revolution, the upper ends thereof being of reduced width and being curved inwardly and meeting above the upper end of said element where they are suitably secured together, the major middle portion of each blade being substantially flat and slightly inclined rearwardly from the radius of the orbit of revolution, and the in-turned upper portion thereof curving rearwardly.

6. A fan comprising a rotatable element and a plurality of blades carried thereby to revolve therewith, said blades being disposed longitudinally and substantially edgewise with respect to the axis of revolution, the upper ends thereof being of reduced width and being curved inwardly to meet above the upper end of said element where they are suitably secured together, the major middle portion of each blade being substantially flat, and the in-turned upper portion thereof being curved away from and the lower end being curved toward the direction of movement of said blades.

7. In a fan, the combination, with a motor and a substantially vertically disposed motor shaft projecting upwardly from the motor casing, of a plurality of blades having their upper ends secured together above the upper end of said shaft and curving downwardly therefrom in substantially edgewise disposition with respect to said shaft and said motor, said blades being elongated in the direction of the axis of revolution to revolve around said motor and the outer edge of each thereof describing a substantially circular curve.

8. In a fan, the combination, with a motor and a substantially vertically disposed motor shaft projecting upwardly from the motor casing, of a plurality of blades having their upper ends secured to each other above the upper end of said shaft and curving downwardly therefrom in substantially edgewise disposition with respect to said motor and shaft, and laterally projecting arms having suitable connection with said shaft to support and revolve said blades.

In testimony whereof I affix my signature.

FRED C. HOWE.